US010244468B2

(12) United States Patent
Newham

(10) Patent No.: US 10,244,468 B2
(45) Date of Patent: *Mar. 26, 2019

(54) SMART BATTERY WEAR LEVELING FOR AUDIO DEVICES

(71) Applicant: QUALCOMM Incorporated, San Diego, CA (US)

(72) Inventor: Adam E. Newham, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/910,598

(22) Filed: Mar. 2, 2018

(65) Prior Publication Data

US 2018/0199282 A1 Jul. 12, 2018

Related U.S. Application Data

(63) Continuation of application No. 13/481,831, filed on May 26, 2012, now Pat. No. 9,949,205.

(51) Int. Cl.
*H04W 52/02* (2009.01)
*H04R 1/10* (2006.01)

(52) U.S. Cl.
CPC ...... *H04W 52/0206* (2013.01); *H04R 1/1091* (2013.01); *H04R 2420/07* (2013.01); *H04R 2460/03* (2013.01); *Y02D 70/00* (2018.01); *Y02D 70/142* (2018.01); *Y02D 70/144* (2018.01); *Y02D 70/164* (2018.01); *Y02D 70/22* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 6,901,275 | B1 | 5/2005 | Aoyagi |
| 7,801,150 | B1 | 9/2010 | Rupavatharam |
| 7,996,496 | B2 | 8/2011 | Haartsen et al. |
| 7,996,571 | B2 | 8/2011 | Salokannel |

(Continued)

FOREIGN PATENT DOCUMENTS

| | | |
|---|---|---|
| CN | 1708023 A | 12/2005 |
| CN | 102307258 A | 1/2012 |

(Continued)

OTHER PUBLICATIONS

International Search Report and Written Opinion—PCT/US2013/038142—ISA/EPO—dated Jul. 18, 2013.
Taiwan Search Report—TW102116398—TIPO—dated Apr. 1, 2015.

*Primary Examiner* — Raymond S Dean
(74) *Attorney, Agent, or Firm* — The Marbury Law Group/Qualcomm

(57) ABSTRACT

Various embodiments provide systems and methods among wireless earpieces in a wireless communication network that enable balancing the batteries in the wireless earpieces to be depleted at approximately the same rate. Various embodiments intelligently and dynamically swap master/slave roles among two or more Bluetooth® wireless earpieces coupled to a data source device to optimize battery life in both wireless earpieces. The various embodiments provide methods and systems for swapping master-slave roles so that there is less impact on the user experience.

31 Claims, 11 Drawing Sheets

(56) References Cited

U.S. PATENT DOCUMENTS

| | | |
|---|---|---|
| 8,737,917 B2 | 5/2014 | Desai et al. |
| 8,768,252 B2 | 7/2014 | Cook et al. |
| 9,020,437 B2 | 4/2015 | Watson et al. |
| 9,621,987 B2 | 4/2017 | Watson et al. |
| 2002/0145980 A1 | 10/2002 | Morley et al. |
| 2007/0010206 A1 | 1/2007 | Caldwell et al. |
| 2008/0151801 A1 | 6/2008 | Mizuta |
| 2008/0279158 A1 | 11/2008 | Schmidt et al. |
| 2008/0291853 A1 | 11/2008 | Wiatrowski et al. |
| 2009/0141653 A1 | 6/2009 | McNeill et al. |
| 2009/0180649 A1 | 7/2009 | Hsu et al. |
| 2009/0197532 A1 | 8/2009 | Wyper |
| 2010/0240345 A1 | 9/2010 | Karrman et al. |
| 2010/0304674 A1 | 12/2010 | Kim et al. |
| 2011/0059769 A1 | 3/2011 | Brunolli et al. |
| 2011/0158441 A1 | 6/2011 | Batra |
| 2011/0286615 A1 | 11/2011 | Olodort et al. |
| 2012/0044062 A1 | 2/2012 | Jersa et al. |
| 2012/0155670 A1 | 6/2012 | Rutschman |
| 2012/0230510 A1 | 9/2012 | Dinescu et al. |
| 2012/0233644 A1 | 9/2012 | Rao |
| 2012/0328107 A1 | 12/2012 | Nystroem et al. |
| 2013/0316642 A1* | 11/2013 | Newham ........... H04W 52/0206 455/11.1 |
| 2017/0188152 A1 | 6/2017 | Watson et al. |

FOREIGN PATENT DOCUMENTS

| | | |
|---|---|---|
| TW | 201114269 A | 4/2011 |
| WO | 2011031910 A1 | 3/2011 |
| WO | 2012161927 A1 | 11/2012 |
| WO | 2013032578 A1 | 3/2013 |

\* cited by examiner

SMART BATTERY WEAR LEVELING FOR AUDIO DEVICES

RELATED APPLICATIONS

This application is a continuation of U.S. patent application Ser. No. 13/481,831 entitled "Smart Battery Wear Leveling for Audio Devices," filed on May 26, 2012, the entire contents of which are incorporated herein by reference.

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become smaller, more powerful and more feature-rich than ever. Many of these devices now have impressive processing capabilities, large memories, and radios/circuitry for wirelessly sending and receiving information.

Wireless communication technologies have also improved over the past several years. Wireless local area networks are now replacing wired networks in many homes and offices. Short-range wireless technologies, such as Bluetooth® and WiFi, enable high speed communications between mobile electronic devices (e.g., cellular phones, watches, headphones, remote controls, etc.) that are within a relatively short distance of one another (e.g., 100 meters or less).

SUMMARY

The various embodiments include systems, methods, and devices configured to balance power consumption among wireless devices operating in a master-slave configuration by periodically exchanging master and slave roles in a manner that is less noticeable to a user.

Various embodiments include methods of balancing power consumption among wireless nodes by establishing a first communication link between a first wireless node and a second wireless node, establishing a second communication link between the first wireless node and a source wireless device, receiving data transmissions from the source wireless device on the first wireless node over the second communication link, relaying at least a portion of the data transmissions from the first wireless node to the second wireless node over the first communication link, determining whether to exchange master-slave roles between the first wireless node and the second wireless node, exchanging master-slave roles between the first wireless node and the second wireless node in response to determining that it is time to exchange master-slave roles, and receiving the data transmissions from the source wireless device on the second wireless node over the second communication link. In an embodiment, the method may include monitoring the data transmissions to identify periods of low data transmission or pauses, and exchanging the master-slave roles between the first wireless node and the second wireless node during an identified period of low data transmission or pauses. In a further embodiment, monitoring for a period of low data transmission may include monitoring for a break between songs in a stream of music.

In an embodiment, the method may include monitoring battery states of the first and second wireless nodes, in which determining whether to exchange master-slave roles between the first wireless node and the second wireless node may include determining whether to exchange master-slave roles based on a battery state of one or both of the first and second wireless nodes. In a further embodiment, exchanging master-slave roles between the first wireless node and the second wireless node may include terminating the first communication link between the first wireless node and the second wireless node, terminating the second communication link between the source wireless device and the first wireless node, and establishing a third communication link between the second wireless node and the source wireless device immediately after terminating the second communication link. In a further embodiment, exchanging master-slave roles between the first wireless node and the second wireless node may include switching addresses in link key fields associated with the first and second wireless nodes. In a further embodiment, the first wireless node, second wireless node, and source wireless device may be nodes in a piconet.

In a further embodiment, exchanging master-slave roles between the first wireless node and the second wireless node in response to determining that it is time to exchange master-slave roles may include controlling a media source on the source wireless device so that master-slave roles are exchanged without disruption of data transmissions from the source wireless device. In an embodiment, the method may include determining whether an audio signal is currently a monaural sound directed to a particular ear, and directing the audio signal to the one of the first wireless node and second wireless node that is positioned in the particular ear after exchanging master-slave roles between the first wireless node and the second wireless node. In an embodiment, the method may include determining whether the source wireless device is currently able to receive a pause request, and transmitting the pause request to the source wireless device in response to determining that master-slave roles should be exchanged and determining that the source wireless device is currently able to receive the pause request, in which exchanging master-slave roles between the first wireless node and the second wireless node is accomplished in response to the source wireless device pausing data transmissions.

Further embodiments include a computing device having a transceiver, a memory, and a processor coupled to the transceiver and the memory, in which the processor is configured with processor-executable instructions to perform operations including establishing a first communication link with a second computing device, establishing a second communication link with a source wireless device, receiving data transmissions from the source wireless device over the second communication link, relaying at least a portion of the data transmissions to the second computing device over the first communication link, determining whether to exchange master-slave roles with the second computing device, and exchanging master-slave roles with the second computing device in response to determining that it is time to exchange master-slave roles. In further embodiments, the computing device processor may be configured with processor-executable instructions to perform other operations of the embodiment methods discussed above.

Further embodiments include a system that may include a first wireless device including a first transceiver, a first memory and a first processor coupled to the first transceiver and the first memory, a second wireless device including a second transceiver, a second memory and a second processor coupled to the second transceiver and the second memory, and a source wireless device including a source transceiver, a source memory and a source processor coupled to the source transceiver and the source memory in which the in which the first, second and/or source processors are configured with processor-executable instructions to perform operations corresponding to the method or processor operations discussed above. In further embodiments, the processors of the system devices may be configured with processor-executable instructions to perform other operations of the embodiment methods discussed above.

Further embodiments include a system having various means for performing functions corresponding to the method or processor operations discussed above.

Further embodiments include a computing device having various means for performing functions corresponding to the method or processor operations discussed above.

Further embodiments include a non-transitory processor-readable storage medium having stored thereon processor-executable instructions configured to cause a processor of a wireless computing device to perform various operations of the embodiment methods discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
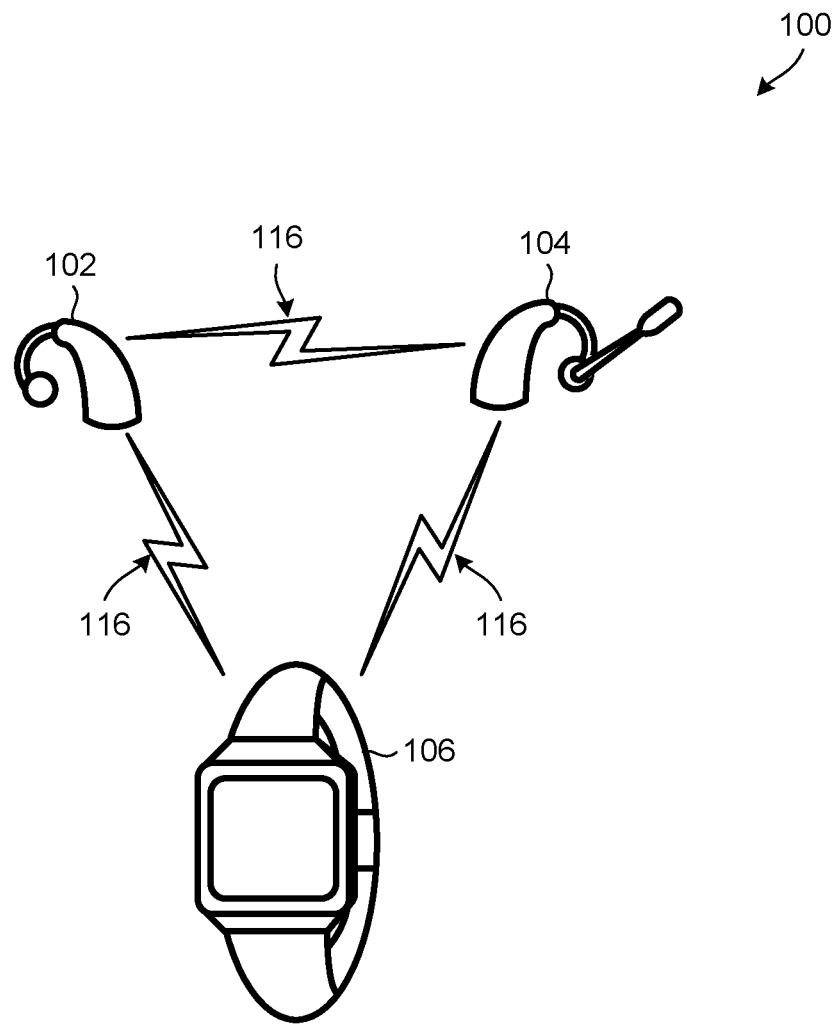
FIG. 1 is a component block diagram illustrating example components and communication links in a composite electronic device suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet enabled cellular telephones, Global Positioning System (GPS) receivers, wireless gaming controllers, and other similar electronic devices that include a programmable processor and circuitry for wirelessly sending or receiving information.

The terms "mobile device," "wireless node" and "receiver device" are used interchangeably herein to refer to any one or all of cellular telephones, smartphones, personal or mobile multi-media players, watches, wrist displays, medical devices, headsets, headphones, speakers, microphones, and/or any electronic device that includes circuitry for wirelessly sending and/or receiving information.

The term "Bluetooth®-enabled device" is used herein to refer to any electronic device that includes a radio frequency (RF) radio and a processor or circuitry for implementing the Bluetooth® protocol stack/interface. Bluetooth® is an open standard for short-range radio frequency (RF) communications. Details of the Bluetooth® standards, interfaces, and technology are set forth in Bluetooth® Special Interest Group (SIG) Specification of the Bluetooth® System Version 4.0 Jun. 30, 2010, which is herein incorporated by reference in its entirety.

As mobile device and wireless technologies continue to improve and grow in popularity, short-range wireless technologies are expected to supplant or replace the need for connecting devices together using cables or wires. As part of this evolution, composite electronic devices made up of multiple independent wireless-enabled devices (e.g., two headphone speakers and a wrist display) are beginning to emerge, and it is becoming more common for individual electronic components (e.g., a headphone) to require wireless communications with multiple components/devices. Such communications may have a disproportionate impact on the battery life of each constituent component in a composite electronic device, and distributing the energy consumption costs amongst constituent components of a composite electronic device is becoming an important and challenging design criterion.

Any electronic device that includes a radio frequency (RF) radio and/or circuitry implementing a short wave wireless protocol/interface is a wireless-enabled device capable of communicating using short wave wireless technology. Such RF radios and circuitry are now being embedded in small electronic devices (e.g., headphone speakers), allowing these devices to communicate using wireless technology and replacing the need for wires or wire based communications. As a result, composite electronic devices made up of multiple independent wireless-enabled devices (e.g., two headphone speakers and a wrist display) are beginning to emerge for which all communications between the constituent components are achieved using wireless technology (e.g., Bluetooth®, WiFi, etc.). However, such extensive use of RF radios may quickly deplete the component's battery and cause the entire composite electronic device to become unusable. This is particularly problematic for smaller components (e.g., headphone speakers) that have size or weight limits that prevent them from including larger and more powerful batteries.

The various embodiments provide wear-leveling methods that enable the wireless communications to be performed so that the battery levels of the devices are depleted at the same rate. Various embodiments intelligently and dynamically swap master/slave roles among two or more wireless receiver devices (e.g., speakers) coupled to a data source device (e.g., phone) to optimize battery life in both devices. The various embodiments provide methods for swapping the master and slave roles so that there is less impact on the user experience. The various embodiments may be implemented using Bluetooth®, WiFi, or other similar short wave wireless communication technologies.

Swapping master/slave roles typically requires that the communication link between the existing master device (e.g., a first earpiece) and the source device (e.g., media player) be torn down and a new communication link be established between a new master device (e.g., second earpiece) and the source device (e.g., media player). The process of tearing down a first link and creating a second link may consume a second or two of time, during which the audio playback may be interrupted. The various embodiments swap master and slave roles so that there is reduced disruption to the audio/data stream (e.g., during a media break). Various embodiments initiate a master/slave swap at points in the communications stream at which a swap is most likely to have a minimal impact on the user experience, such as during periods of silence in between songs.

In various embodiments, the wear-leveling operations may be performed such that the user does not perceive any changes in the operations of the devices. For example, if a composite device is configured such that monaural sound is produced by a first wireless earpiece but not by a second wireless earpiece, as may be the case when a telephone call is underway and the user prefers to receive audio from phone calls in a particular ear, the master and slave roles of outputting the monaural audio of the first and second earpieces may be swapped so that the monaural sound continues to be produced by the first wireless earpiece (e.g., the user's preferred ear for phone calls), irrespective of the changes in master/slave roles. This may be achieved, for example, by the new master (e.g., second earpiece) streaming the monaural audio to the new slave (e.g., first earpiece). This may also be achieved by, for example, by delaying or suspending the role swap operations until it is determined that the information transmitted from the source device (e.g., media player) is such that the master and slave roles may be swapped without impacting the user experience. For example, the master/slave swap may be delayed until a phone call ends.

In an embodiment, the master and slave roles may be swapped in response to determining that information transmitted from the source device (e.g., media player) is to be received on a specific device having a specific role. For example, if the information transmitted from the source device (e.g., media player) requires that a monaural sound be produced by the first wireless earpiece acting in a master role, the system may be configured to place the first wireless earpiece into the master role upon detecting the presence of such information. In this manner, the wear-leveling operations may be performed so that the user does not perceive any changes to device operations.

In another embodiment, the master device may be configured to determine when the audio stream from source device is controllable, such as a media player playing stored music versus receiving a broadcast stream, and when that is the case, issue a command or request to the source device that enables the audio stream to be temporarily halted, such as by executing a pause, to enable the master/slave swap to occur without losing any of the media. This option may be particularly useful when the audio is primarily speech (e.g., a podcast or audio book).

While the various embodiments are particularly useful in mobile devices (e.g., cellular telephones, headsets, watches, wrist displays, etc.), the embodiments are generally useful in any computing device that sends or receives information over a short-range wireless communications link.

Various embodiments are described herein using Bluetooth® and Bluetooth®-related terminology as a convenient example of a communications technology for wirelessly connecting electronic devices located within a relatively short distance of one another (e.g., 100 meters). However, examples referring to Bluetooth®, and other references to the Bluetooth® herein, are for illustration purposes only and are not intended to limit the descriptions or the claims to that particular standard. Therefore, the scope of the claims should not be construed as requiring Bluetooth® technology unless specifically recited as such in the claims.

Bluetooth® technology provides a secure way to connect and exchange information between electronic devices (e.g., headphones, cellular phones, watches, laptops, remote controls, etc.). Because many of the services offered over Bluetooth® can expose private data and/or allow the connecting party to control the connected device, Bluetooth® requires that devices first establish a "trust relationship" before they are allowed to connect to one another. This trust relationship may be established using a process called "pairing" in which a bond formed between the two devices. This bond enables the devices to communicate with each other in the future without further authentication.

The pairing process may be triggered by a specific request to create a bond (e.g., user explicitly requests to "add a Bluetooth® device"), or may be triggered automatically (e.g., when connecting to a service). For example, a Bluetooth® device may automatically initiate the performance of the pairing operations each time the device is powered or moved within a certain distance of another Bluetooth® device. Pairing information relating to current and previously established pairings may be stored in a paired device list (PDL) in the memory of the Bluetooth® device. This pairing information may include a name field, an address field, a link key field, and other similar fields (e.g., profile type, etc.) useful for authenticating the device and/or establishing a Bluetooth® communications link.

Bluetooth® communications may require establishing wireless personal area networks (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet.

A Bluetooth® profile describes general behaviors through which Bluetooth®-enabled devices communicate with other Bluetooth® devices. For example, the hands free profile (HFP) describes how a Bluetooth® device (e.g., phone) may place and receive calls for another Bluetooth® device, and the Advanced Audio Distribution Profile (A2DP) describes how stereo-quality audio may be streamed from a first Bluetooth® device (e.g., phone) to another Bluetooth® device (e.g., headphones). Likewise, the Audio/Video Remote Control Profile (AVRCP) provides an interface that enables a single remote control (or other device) to control all of the devices (e.g., televisions, stereos, etc.) to which a user has access.

Bluetooth® devices may connect to two devices at a time using different Bluetooth profiles. For example, a Bluetooth® receiver device (e.g., headphones) may connect to a first Bluetooth® source devices (e.g., a phone and a media player) at the same time using the A2DP and HFP profiles. This allows the user to listen to music streamed from the first source device (e.g., media player) using A2DP while allowing the second source device to automatically interrupt the play of music to stream speech using HFP (e.g., an incoming telephone call), and then automatically return to streaming music from the media player using A2DP (e.g., upon completion of the call).

Bluetooth® implements a master-slave structure in which a single master Bluetooth® device (referred to herein simply as the "master device") may communicate with up to seven active slave Bluetooth® devices (herein simply "slave devices") in a piconet. A master device may only communicate with the slave devices that are within the same piconet as the master. Slave devices may only communicate with the master device, and thus, communications between two or more slave devices are typically facilitated by the master device.

Master and slave devices may have asymmetrical roles. For example, within each piconet, data may only be transferred over a single connection at a time, and the connection may only be established between the master device and one slave device. Therefore, the master may be responsible for identifying and selecting slave devices with which to communicate, which may require rapidly switching the connection from one slave device to another in a round-robin fashion to avoid starving or neglecting slave devices requesting to send or receive information. In addition, since communications between two slave devices must be facilitated by the master device, the master device may also be responsible for receiving information from a sending slave device, identifying a target slave device, and retransmitting the information to the identified target device. Slave devices, on the other hand, may only be responsible for monitoring or polling a port to receive information from the master device. These asymmetrical roles may result in the master device performing operations that consume a different amount of energy than the operations performed by the slave devices, causing one device to deplete its battery faster than the others.

FIG. 1 is a component block diagram illustrating an example composite electronic device 100 suitable for use with the various embodiments. The composite electronic device 100 may include a left earpiece 102, a right earpiece 104, and a wrist display 106, each of which may be independently Bluetooth® enabled. Each component 102, 104, 106 may be individually paired to each of the other components via wireless communication links/pairings 116. These links/pairings 116 may be established at the factory so that the user perceives the composite electronic device 100 as a single component.

Each earpiece 102, 104 may include a speaker for generating sounds based on audio signals received from the wrist display 106, another earpiece 104, 102, or a third party device (e.g., phone). The wrist display 106 may include a media player that transmits wireless audio and/or control streams to the earpieces 102, 104. In an embodiment, the wrist display 106 may be configured to transmit an audio data stream and a control stream to each of the earpieces 102, 104. In these embodiments, the control stream may be transmitted via a separate out-of-band channel.

In an embodiment, the wrist display 106 may transmit the audio and/or control streams to a first earpiece 102, 104, which may receive the wireless transmission and transmit a stream to the second earpiece 104, 102. In these embodiments, the first earpiece 102, 104 must operate as the master device because it is both sending and receiving information.

In an embodiment, two or more of the components 102, 104, 106 may be coupled together in an advanced audio distribution profile (A2DP) configuration. In an embodiment, two or more components 102, 104, 106 may be coupled together using a proprietary protocol that allows for communications in addition to, or independent of, the Bluetooth® communications.

Figure 2:
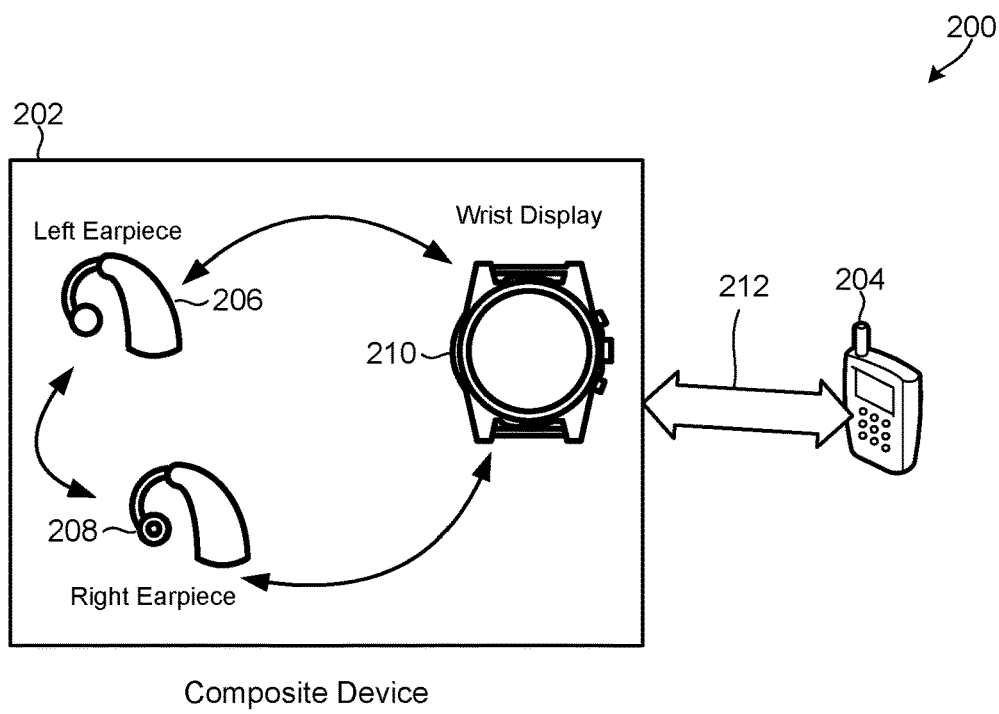
FIG. 2 is a component block diagram illustrating example pairings and components in a configuration suitable for implementing the various embodiments.

FIG. 2 is a block diagram illustrating example wireless links and components in a configuration 200 suitable for implementing the various embodiments. In the illustrated example of FIG. 2, a composite electronic device 202 includes multiple independently Bluetooth® enabled components that include a wrist display 210, a left earpiece 206 and a right earpiece 208. The composite device 202 may communicate with a Bluetooth® enabled phone 204 via wireless a communication link 212. The phone 204 may be paired to each of the wrist display 210, left earpiece 206, and right earpiece 208.

Two or more components (e.g., left earpiece 206 and right earpiece 208) may be coupled together in an advanced audio distribution profile (AADP). In an embodiment, the phone 204 or wrist display 210 may configured to transmit the audio and/or control streams to a first earpiece 206, 208, which may receive the wireless transmission and transmit a second stream to the second earpiece 208, 206. In such embodiments, the first earpiece 206, 208 operates as the master device because it is both sending and receiving information, which may cause the first earpiece 206, 208 to deplete its battery faster than the slave devices (e.g., second earpiece 208, 206).

The various embodiments provide wear-leveling methods that enable the Bluetooth® communications to be performed so that the battery levels of the devices are depleted at approximately the same rate. For example, the first and second earpieces 206, 208 may cooperate to dynamically swap master and slave roles in a manner that balances the load on each device's battery. The earpieces 206, 208 may negotiate the master/slave roles based on the amount of battery life remaining on each device (e.g., device having the most charge operates as the master).

Swapping master/slave roles may require that the communication link between an existing master device (e.g., first earpiece 206) and a source device (e.g., phone 202) be torn down and a new communication link be established between a new master device (e.g., second earpiece 208) and the source device (e.g., phone 202). The process of tearing down a first link and creating a second link may consume a second or two of time, during which the audio playback in the earpieces may be interrupted. The various embodiments may swap master and slave roles at times or points in the communication stream at which one of the device processors determines that there will be less disruption to data being sent in the audio/data stream (e.g., during a media break), and thus reduced impact on the user experience.

In an embodiment, the MAC address in the link keys associated with the earpieces 206, 208 may switched before swapping master/slave roles so that the source device (e.g., phone 204 or wrist display 210) is unaware of the role change. This embodiment allows for the earpiece master/slave roles to be swapped without tearing down the link to the source device.

Various embodiments may identify points in the communications stream in which a role-switch is likely to have less impact on the user experience, and perform the role-switch operations at the identified points. These points may be identified based on an in-band audio signal, silence detection algorithms, media breaks, and/or an out-band communications link signal. For example, data being communicated to the earpieces 206, 208 from the phone 202 may be monitored by a processor in the earpiece currently performing the master role to identify pauses (e.g., silence between songs in a radio or MP3 data stream) or periods of low data traffic, and when such a pause is identified, initiate the master/slave role swap. In various embodiments, media breaks may be detected by subscription Bluetooth® events in an Audio/Video Remote Control Profile (AVRCP) profile (e.g., AVRCP >1.3), by trapping an application programming interface (API) from the source device's media player, and/or by using track meta data (e.g., track length, current track position, etc.).

As discussed above, the wear-leveling operations may be performed such that the user does not perceive any changes in the operations of the devices. In an embodiment, the first and second earpieces 206, 208 may be configured to swap master and slave roles in response to determining that information transmitted from the source device (e.g., phone 202) is to be received on a specific device (e.g., first earpiece 206) having a specific role (e.g., master role), and that the designated device (e.g., first earpiece 206) is not currently acting in the specified role (e.g., master). In an embodiment, it may be determined that information transmitted from the source device (e.g., phone 202) is to be received on a specific device having a specific role (e.g., first earpiece 206 serving as the master) by detecting that the transmitted information is monaural sound information.

In an embodiment, the first and second earpieces 206, 208 may be configured to delay or suspend role swap operations until it is determined that the information transmitted from the source device (e.g., phone 202) is such that the master and slave roles may be swapped without impacting the user experience. This may be achieved, for example, by detecting that the information transmitted by the source device is monaural sound information.

Figure 3A:
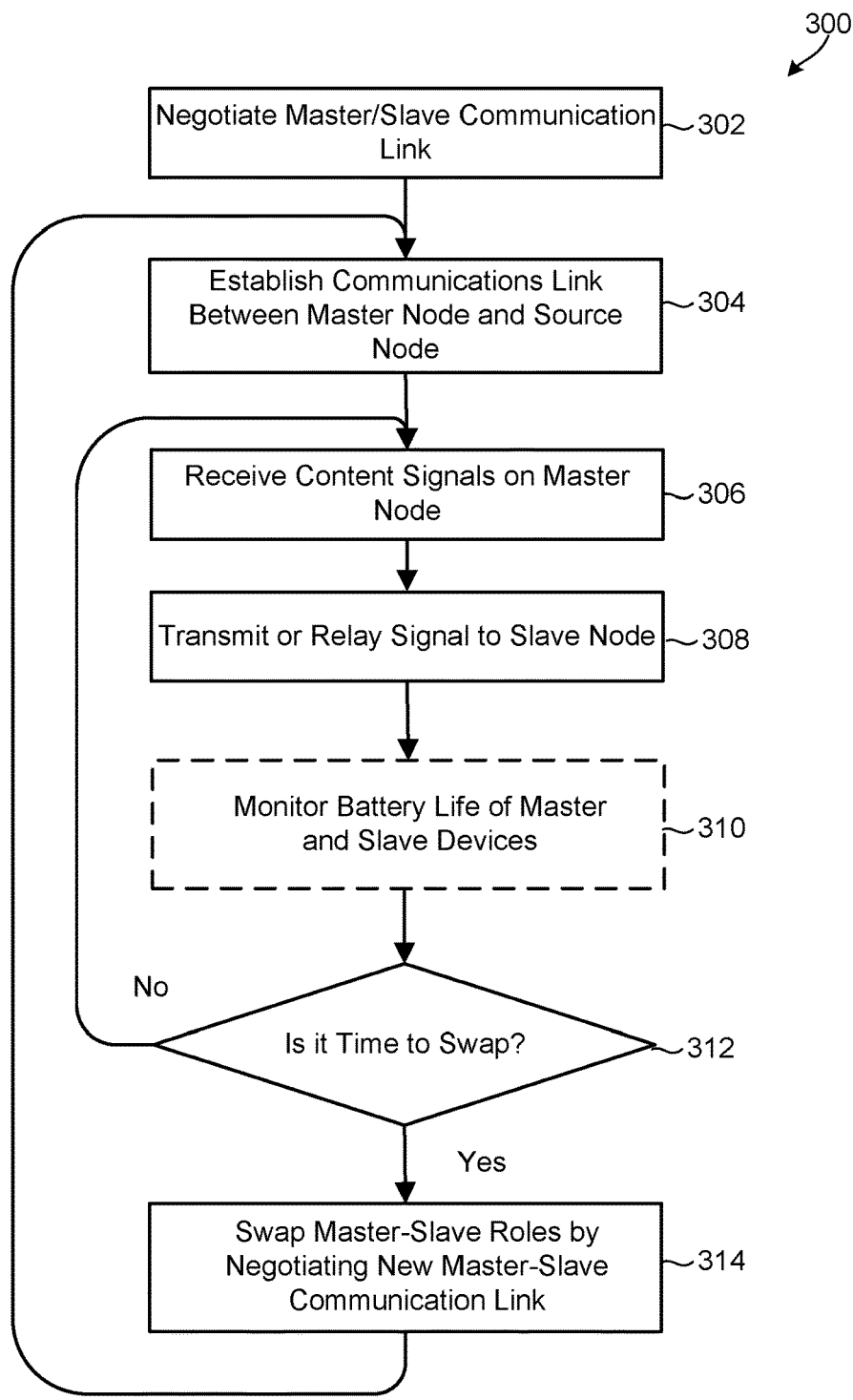
FIGS. 3A-3B are process flow diagrams of embodiment methods for dynamically swapping master and slave roles to balance power consumption among wireless nodes.

FIG. 3A illustrates an embodiment method 300 for dynamically swapping master and slave roles to balance the load on each wireless node device's battery. The operations in method 300 may be accomplished by processors within each wireless node (e.g., left and right earpieces) configured with processor-executable instructions implementing the method, so references to each wireless node encompass the processor within the node. In block 302, a first wireless node (e.g., left earpiece) may negotiate a communications link (e.g., Bluetooth® link) with a second wireless node (e.g., right earpiece). As part of block 302, the first wireless node may assumes a role as a master Bluetooth device and the second wireless may assume a role as a slave wireless device. In block 304, the first wireless node may establish a communications link (e.g., Bluetooth® link) with a wireless source component (e.g., wrist display, phone). In block 306, the first wireless node may begin receiving audio and/or data streams from the source component. In block 308, the first wireless node may begin transmitting or relaying the audio or data streams to a second wireless node. In optional block 310, the first wireless node (or another component in the system) may monitor the battery consumption of the wireless nodes.

In determination block 312, the first and second wireless nodes may determine whether it is time to swap roles. This determination may be based on various factors, such as battery usage, periods of inactivity or silence, a time value, measured energy consumption, processor instructions performed, current battery level, differences in battery states between the two wireless nodes, etc. For example, the first and second wireless nodes may consider the amount of time that the first device has performed the master role, the amount of battery consumed by the master device, the amount of battery remaining on the slave device, the types or volume of the communications being transmitted, the number of master-specific operations required to process the communications, and other similar factors. So long as the wireless nodes determine that it is not time to swap roles (i.e., determination block 312="No"), the first and second wireless nodes may continue to receive content over the established communications links in block 306. When one of the wireless node processors determines that it is time to swap roles (i.e., determination block 312="Yes"), in block 314 the first and second wireless nodes may swap roles by negotiating a new master-slave communications link. In an embodiment, swapping roles may include switching MAC address in the link keys associated each receiver device.

Figure 3B:
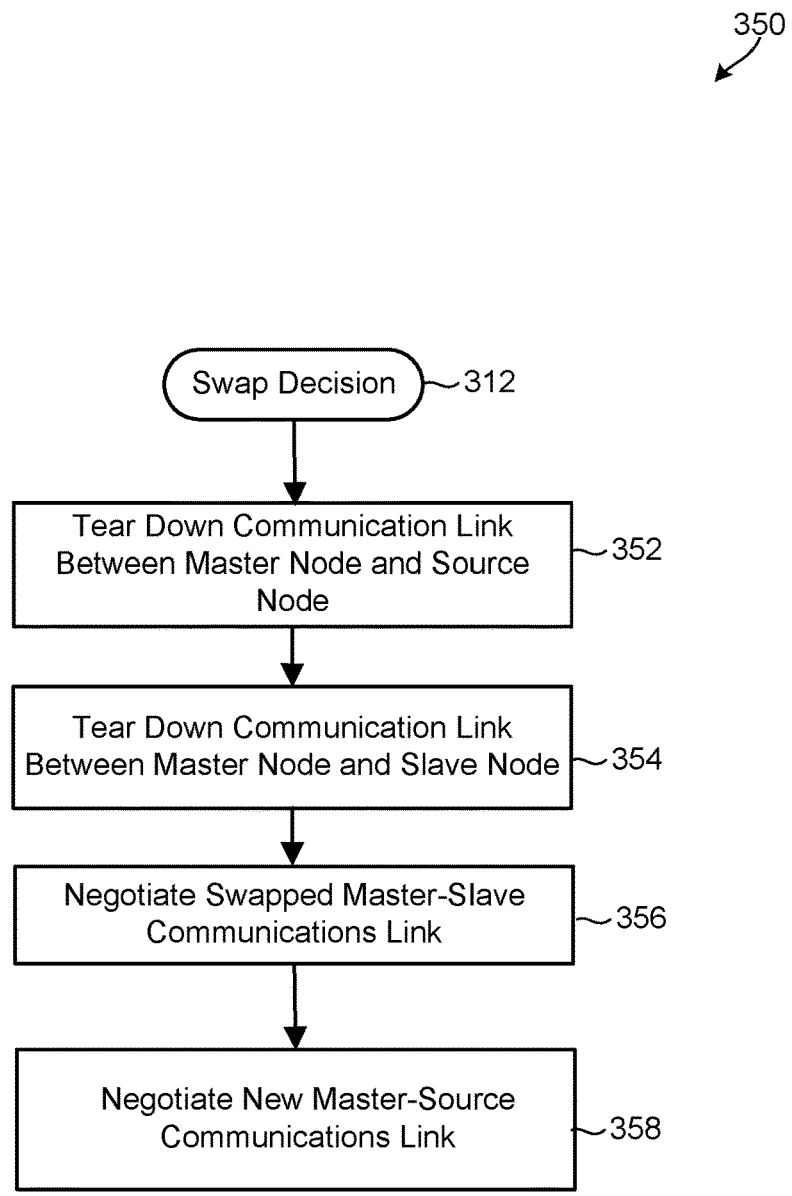

FIG. 3B illustrates an embodiment method 350 for dynamically swapping master and slave roles. Method 350 may be implemented in processors of the wireless nodes as part of block 314 of method 300, such as in response to determining that it is time to swap roles in determination block 312. In block 352 of method 350, the communication link between a first wireless node (i.e., master node) and the source node may be terminated. In block 354, the communication link between the first wireless node and the second wireless node may be terminated. In block 356, the first and second wireless nodes may swap master and slave roles, and establish a new communications link between the new master node (e.g., second wireless node) and the new slave node (e.g., first wireless node). This may be accomplished by the wireless node assuming the master role initiating the handshaking communications necessary to establish the new communication link while the wireless node assuming the slave role cooperates in the handshaking communications. In block 358, the second wireless node acting as the new master node may establish a communications link with the source device. In an embodiment, block 358 may be performed as part of block 304 of method 300.

Figure 4A:
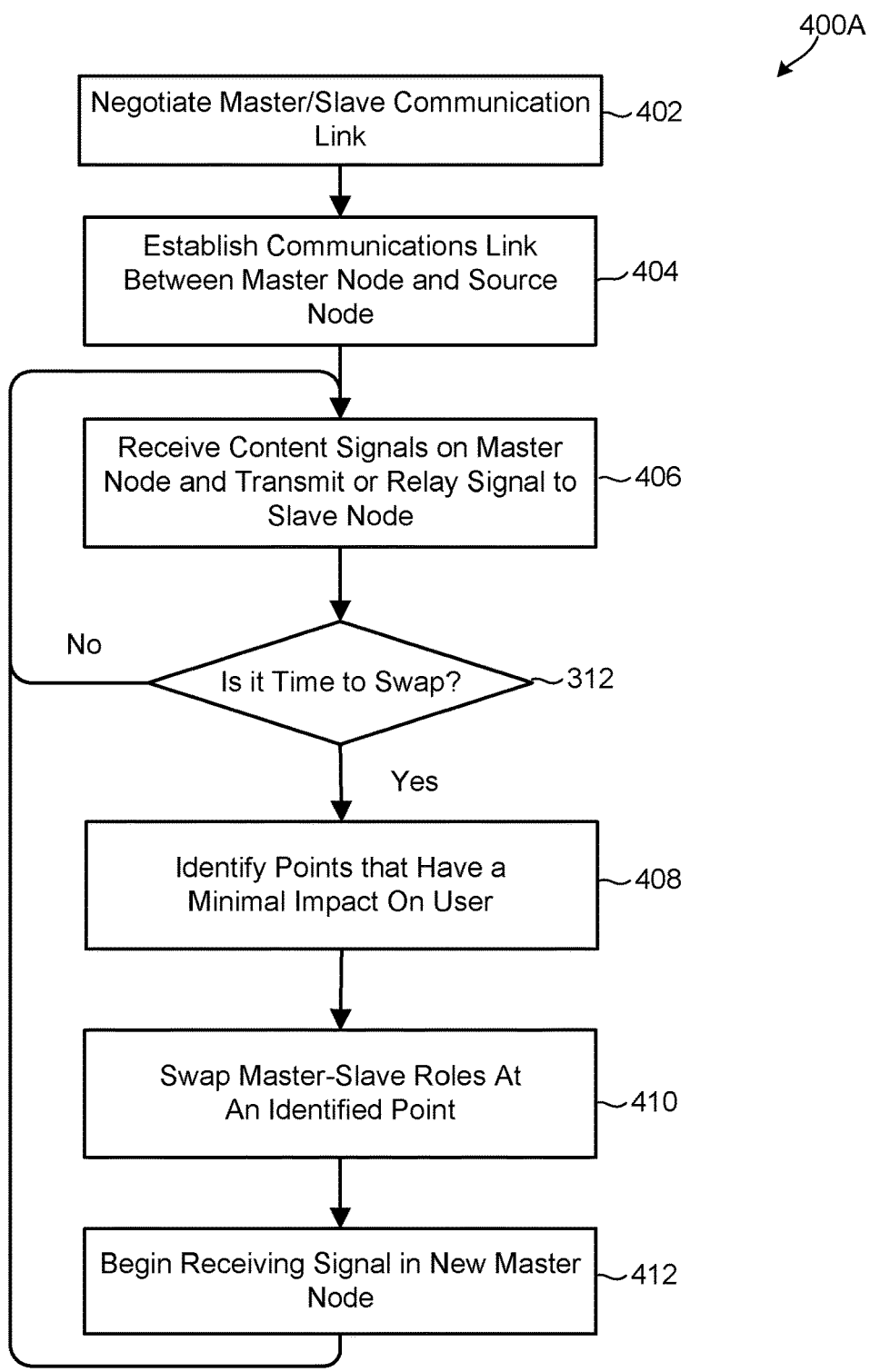
FIGS. 4A-4C are process flow diagrams of embodiment methods for dynamically swapping master and slave roles so that the role changes have reduced impact on the user experience.

FIG. 4A illustrates an embodiment method 400A for dynamically swapping master and slave roles so that there is reduced impact on the user experience. In block 402, a first wireless node (e.g., left earpiece) may negotiate a communications link (e.g., Bluetooth® link) with a second wireless node (e.g., right earpiece). As part of block 402, the first wireless node may assume the role as a master Bluetooth device and the second wireless may assume the role as a slave wireless device. In block 404, the first wireless node may establish a communications link (e.g., Bluetooth® link) with a wireless source component (e.g., wrist display, phone) as a master device. In block 406, the first wireless node may begin receiving audio and/or data streams from the source component, and transmit or relay the audio/data streams to the second wireless node. In determination block 312, the first and second wireless nodes may determine whether it is time to swap roles based on various factors, such as battery usage, periods of inactivity or silence, a time value, measured energy consumption, processor instructions performed, current battery level, differences in battery states between the two wireless nodes, etc. So long as the wireless nodes determine that it is not time to swap roles (i.e., determination block 312="No"), the first and second wireless nodes may continue to receive content over the established communications links in block 406. When one of the wireless node processors determines that it is time to swap roles (i.e., determination block 312 ="Yes"), in block 408, the first wireless node (or another component in the system) may monitor the signal to identify points in the communications stream in which a role-switch is likely to have a less impact on the user experience. In block 410, the first and second first wireless node may swap master-slave roles, which may include switching MAC address in the link keys associated each receiver device. In block 412, the second wireless node (new master node) may begin receiving the signals transmitted from the source device and forward the received signals to the first receiver device (new slave), essentially returning to block 406 to continue the process described above.

In an embodiment, the components may be coupled in an advanced audio distribution profile (A2DP) configuration that supports frequency master/slave role changes. The A2DP protocol does not support two individual components and only one device (referred to here as the "master") is visible to the phone at any given point in time. In such configurations, various embodiments may perform the pairing operations so that the master component that advertises the A2DP connection (e.g., wrist display) receives the information and retransmits the information to a slave component (e.g., a wireless earbud). In these embodiments, all the components remain paired to the third-party device and the master relays the information to the other nodes. This may be enabled by the components being grouped or sold together in a composite device so they may be configured to be aware of the protocol stacks of the other components.

Figure 4B:
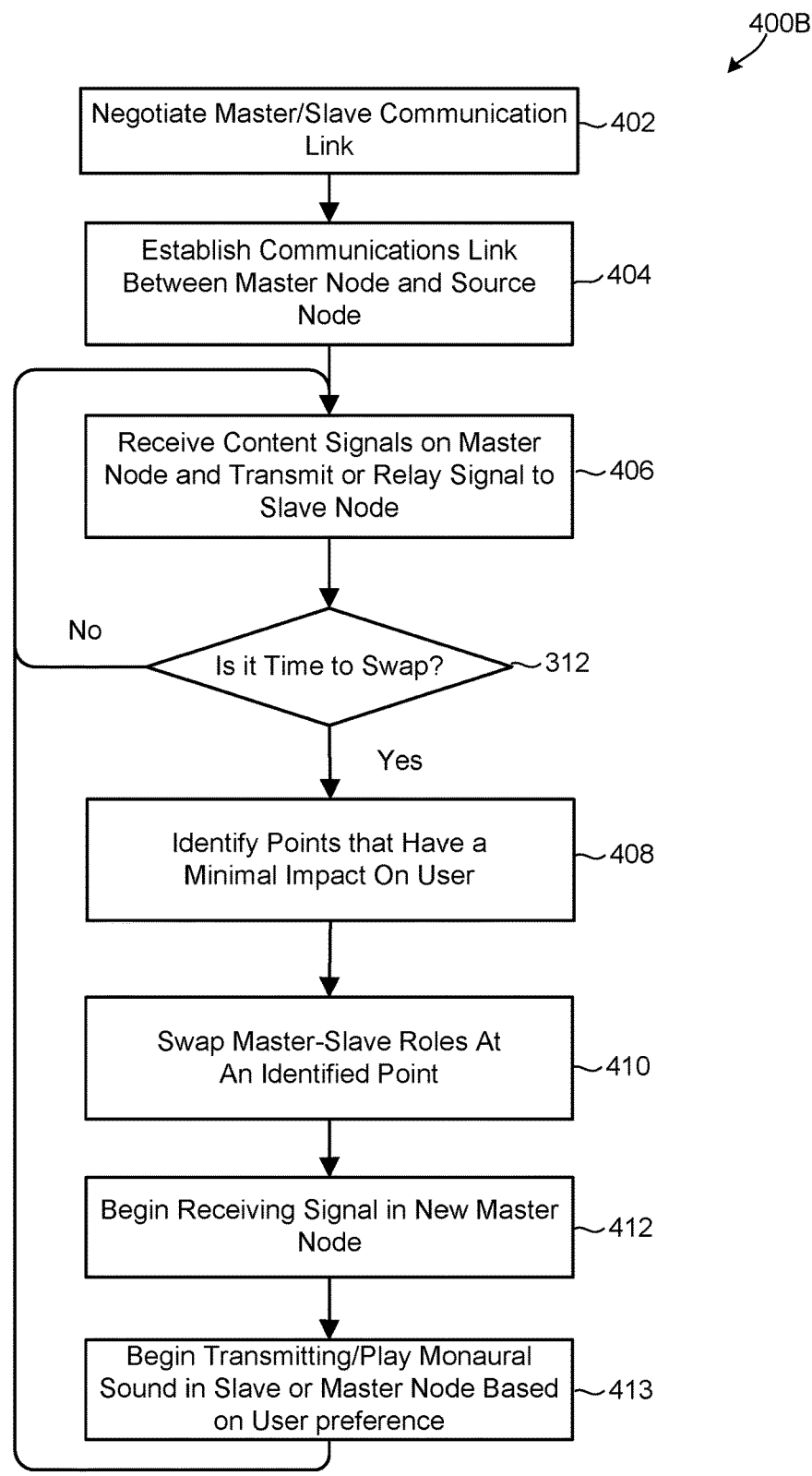

FIG. 4B illustrates an embodiment method 400B for dynamically swapping master and slave roles that includes accommodates situations in which only monaural sound is being transmitted and the user has a preferred ear for receiving monaural sound (e.g., and ear preferred for telephone calls). Method 400B is substantially similar to method 400A described above with reference to FIG. 4A, with the addition of block 413 in which the new master node is determines the appropriate year for playing monaural sound, and neither begins generating that monaural sound if the new master node is in the user's preferred ear, or transmitting monaural sound to the new slave node if the new slave node is in the user's preferred ear.

Figure 4C:
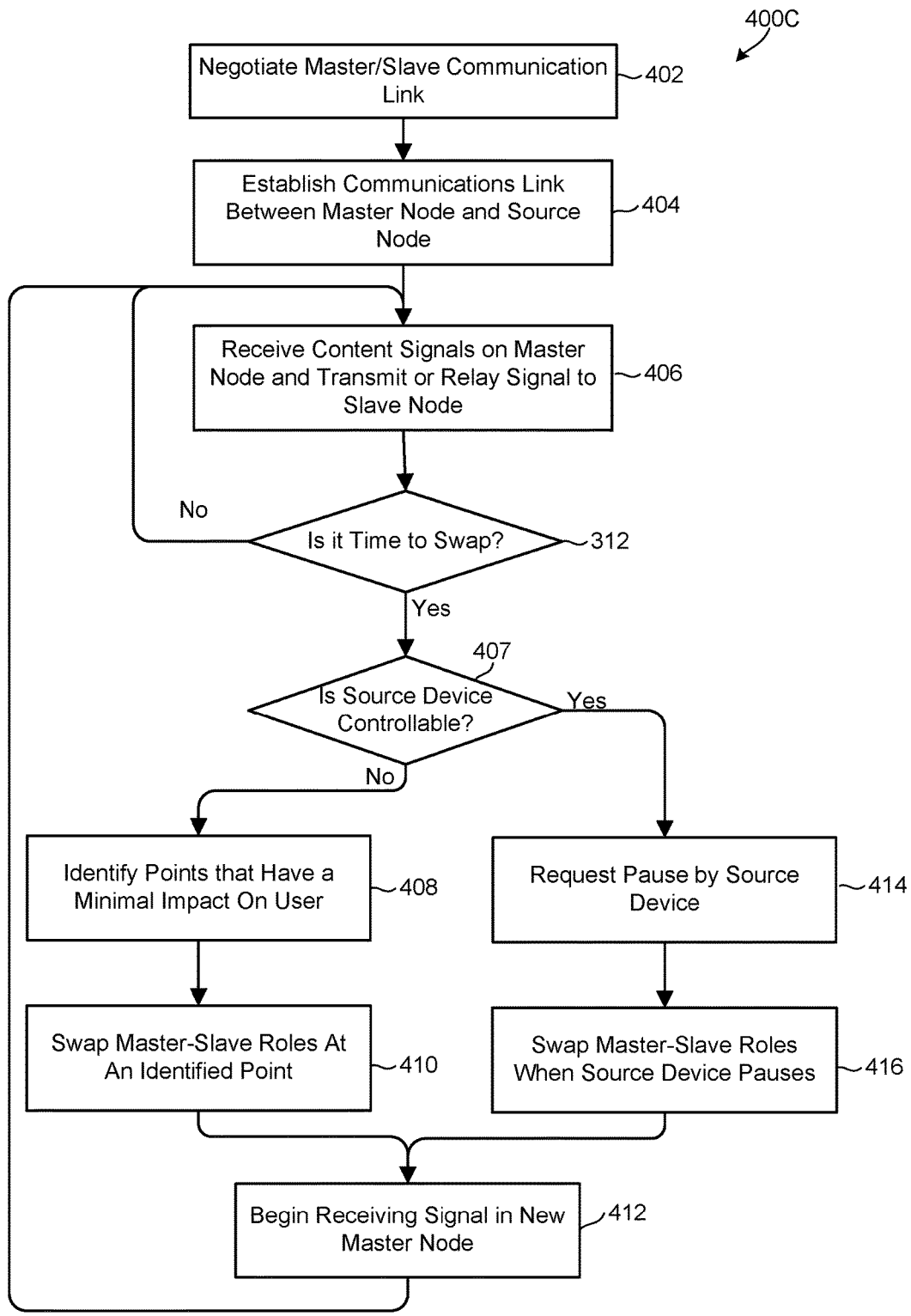

FIG. 4C illustrates an embodiment method 400C for dynamically swapping master and slave roles that accommodates source devices which are receptive to control signals from the master node, such as a pause request. Method 400C is similar to method 400A described above with reference to FIG. 4A, with the addition of determination block 407. In response to determining that it is time to swap the master and slave roles (i.e., determination block 312="Yes"), the master node processor (or another processor) may determine whether the source device is currently controllable in determination block 407. This determination may be based upon the type of source device with which the master node is communicating, such as whether the device is capable of receiving commands or pause request. In an embodiment, this determination may also consider the type of media being played, such as whether the media is a broadcast stream which cannot be interrupted, or a recorded media (e.g., an MP3 file). In a further embodiment, this determination may also consider the type of content being played in a recorded media, such as whether the recorded media is primarily speech, which can easily be caused without impacting the user experience without the need for waiting for a gap between content segments. This embodiment may be useful when the media being played is a podcast, lecture, or audio book.

If the master node processor (or another processor) determines that the source device is currently not controllable (i.e., determination block 407="No"), the processor may continue to execute the operations in blocks 408 through 412 as described above in method 400A with reference to FIG. 4A. If the master node processor (or another processor) determines that the source device is currently controllable (i.e., determination block 407="Yes"), the processor may send a signal to the source device requesting that a positive be executed in block 414. The signal may be any type of control signal that is receivable by the source device, and thus may be defined by the particular make and model of source device. In block 416, the master node processor may then initiate the master/slave role swap operation described above when the source device executes the requested pause. In this operation, the master node processor may wait for a signal from the source device indicating that it is paused or monitor the data stream to detect when the pause has been implemented. After the master/slave role swap is completed in either block 410 or block 416, the second wireless node (new master node) may begin receiving the signals transmitted from the source device and forward the received signals to the first receiver device (new slave), essentially returning to block 406 to continue the process described above.

Figure 5:
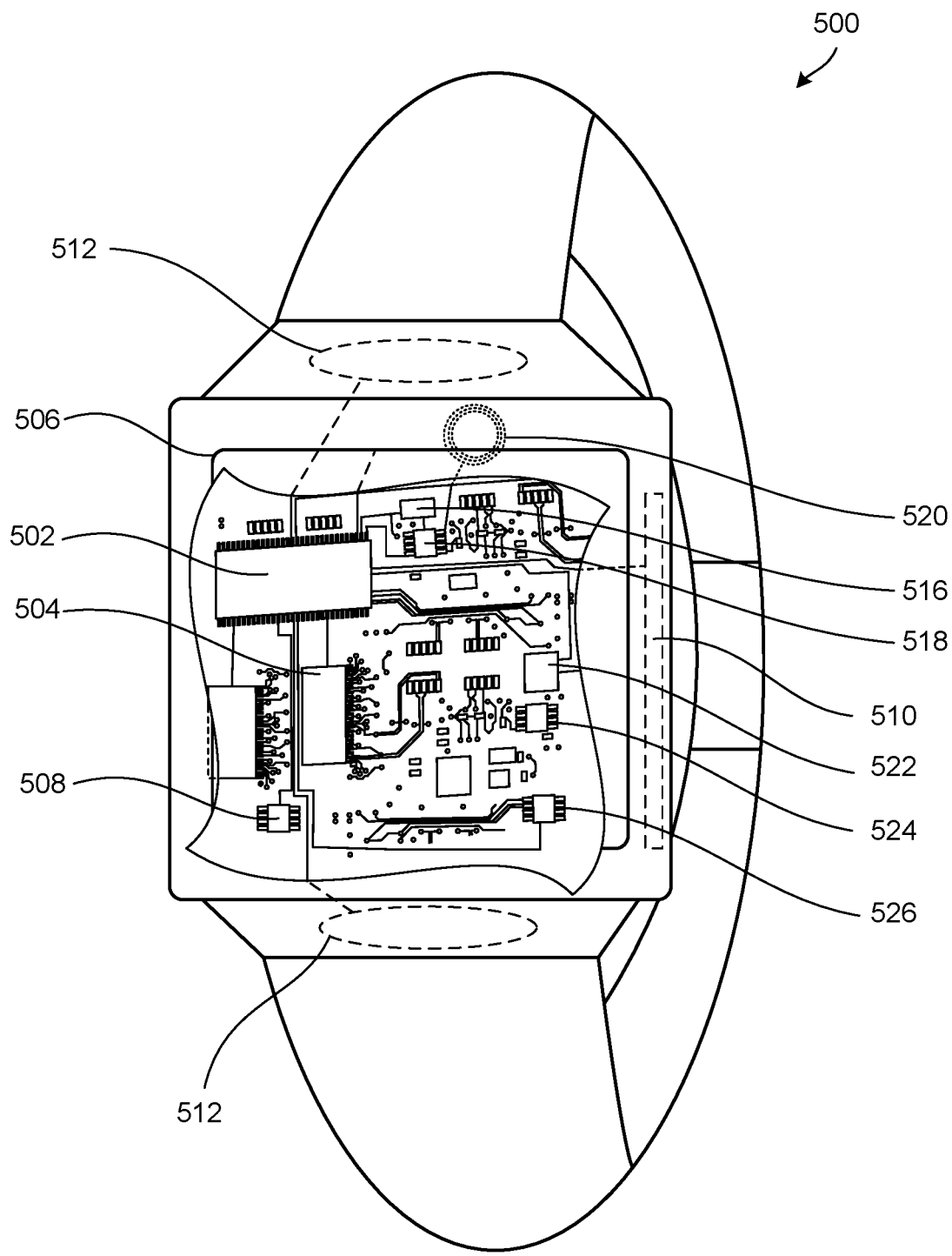
FIG. 5 is an illustration of a wireless wrist watch-type computing device suitable for use with the various embodiments.

The various embodiments described above may be implemented using a variety of wireless-enabled mobile computing devices, such as a wrist watch-type computing device ("wrist display") 500 illustrated in FIG. 5. A wrist watch computing device 500 may include a processor 502 coupled to a volatile and/or non-volatile internal memory 504, which may be secure and/or encrypted memories, unsecure and/or unencrypted memories, or any combination thereof. The processor 502 may also be coupled to an electronic display screen 506, which may be a touch screen display (e.g., resistive-sensing touch screen, capacitive-sensing touch screen infrared sensing touch screen, etc.). The wrist display 500 may have one or more radios (e.g., RF radio) and/or antennas 508 for sending and receiving electromagnetic radiation that may be connected to a wireless data link and coupled to the processor 502. The radios/antennas 508 may be used with the above-mentioned circuitry to implement the Bluetooth® protocol stack/interface (i.e., the wrist display 500 may be Bluetooth® enabled).

The wrist display 500 may also include a slide sensor 510 and physical buttons 512 for receiving user inputs. The wrist display 500 may include a battery 516 coupled to an inductive charging circuit 518, and a coil antenna 520 which may be an inductive coil adapted to enable inductive charging of the battery 516. The battery 516 and inductive charging circuit 518 may be coupled to the processor 502 to enable the wrist display 500 to control inductive charging and generate messages via the coil antenna 520. The wrist display 500 may further include a vibratory motor 522, and various sensors, such as a temperature sensor 524 and accelerometer 526, all of which may be coupled to the processor 502.

Figure 6:
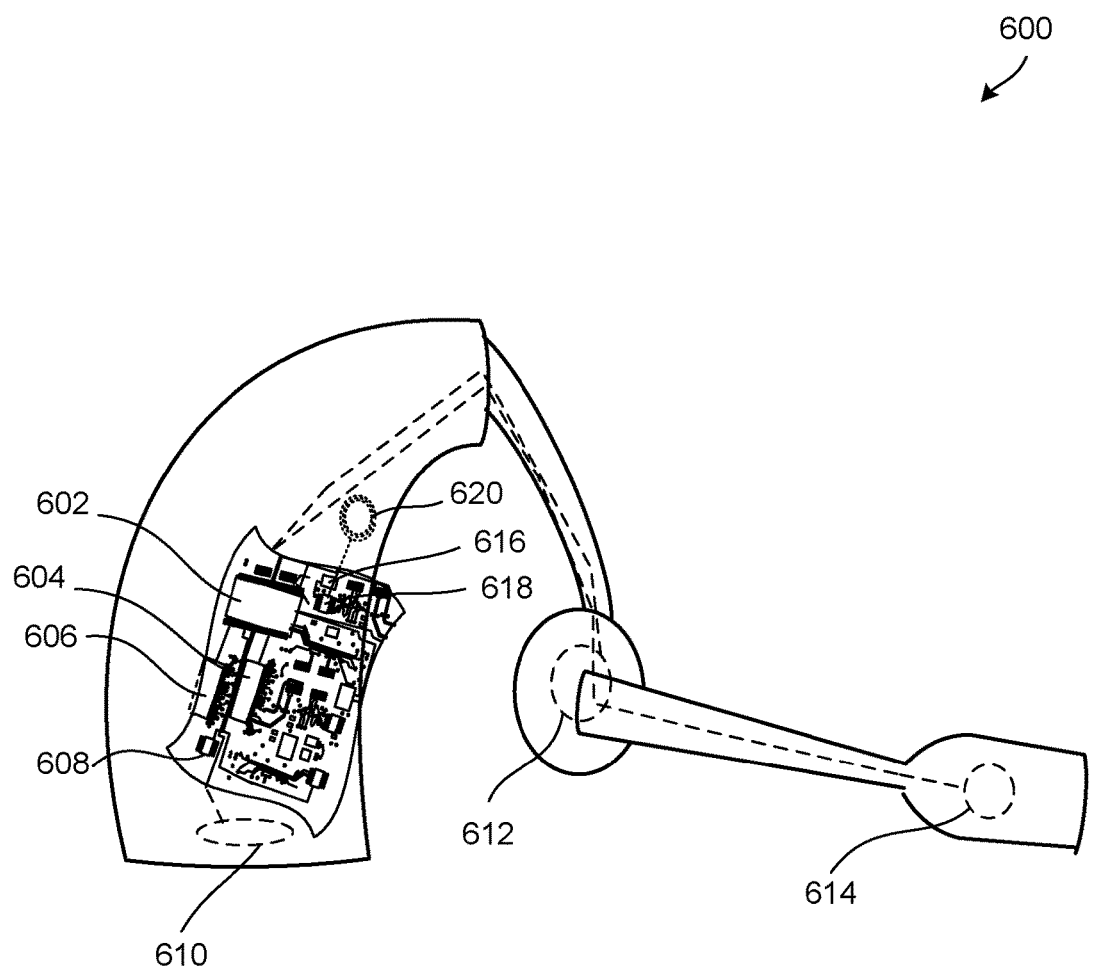
FIG. 6 is an illustration of a wireless earpiece suitable for use with the various embodiments.

Other examples of wireless-enabled mobile computing devices that may be used to implement the various embodiments described above include wireless earpieces, such as wireless earpiece 600 as illustrated in FIG. 6. A wireless earpiece 600 may include a processor 602 coupled to volatile or non-volatile internal memories 604 and 606. The wireless earpiece 600 may include one or more radios/antennas 608 for sending and receiving electromagnetic radiation that may be connected to a wireless data link and coupled to the processor 602. The radios/antennas 608 may be used with the above-mentioned circuitry to implement the Bluetooth® protocol stack/interface (i.e., the wireless earpiece 600 may be Bluetooth® enabled).

The wireless earpiece 600 may also include one or more physical buttons 610 for receiving user inputs, a speaker 612 configured to generate an audio output, and a microphone 614 to receive audio input, all of which may be coupled to the processor 602. The wireless earpiece 600 may further include a battery 616 coupled to an inductive charging circuit 618, and a coil antenna 620 which may be an inductive coil adapted to enable inductive charging of the battery 616.

Figure 7:
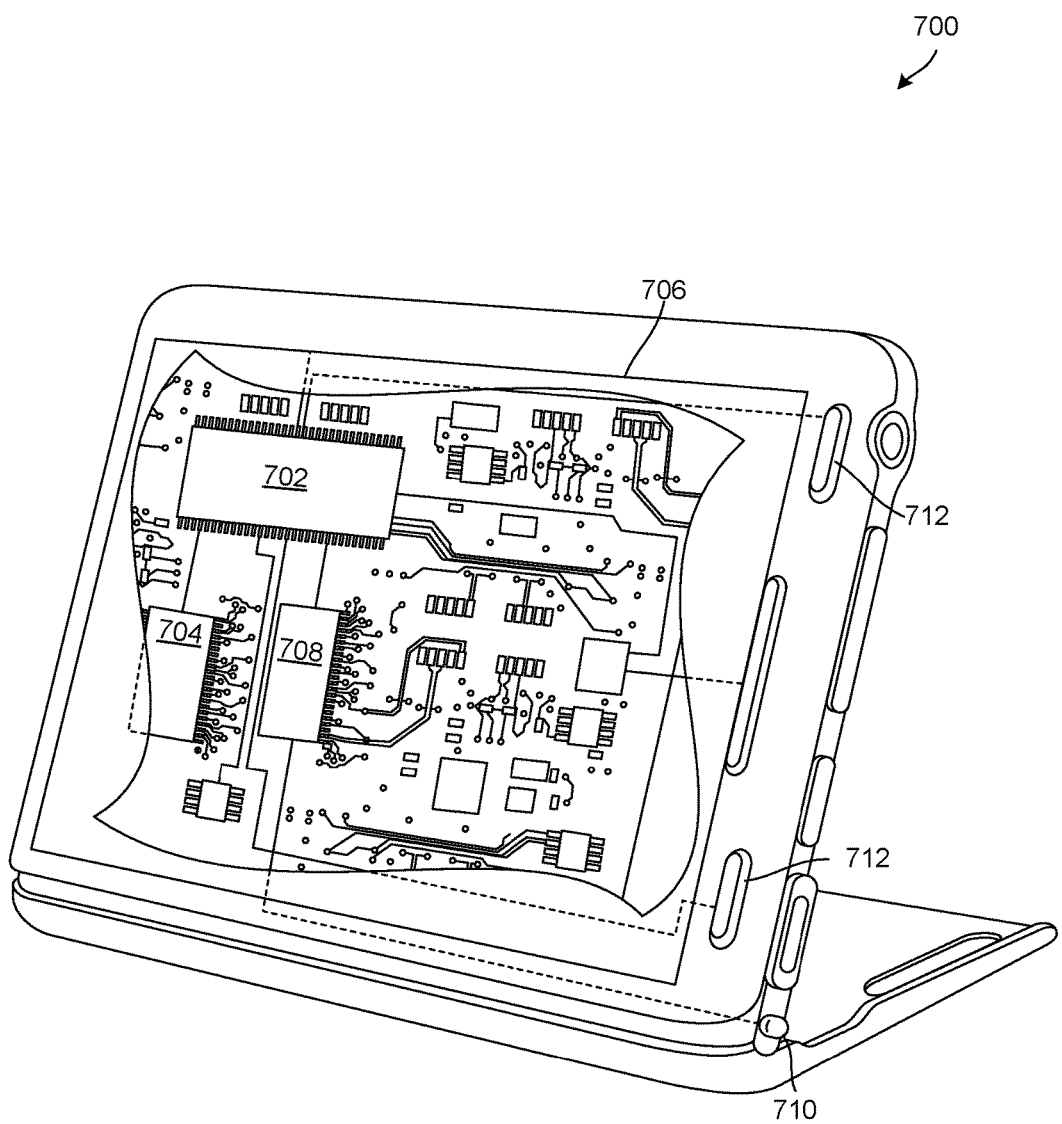
FIG. 7 is an illustration of an example mobile device suitable for use with the various embodiments.
Figure 8:
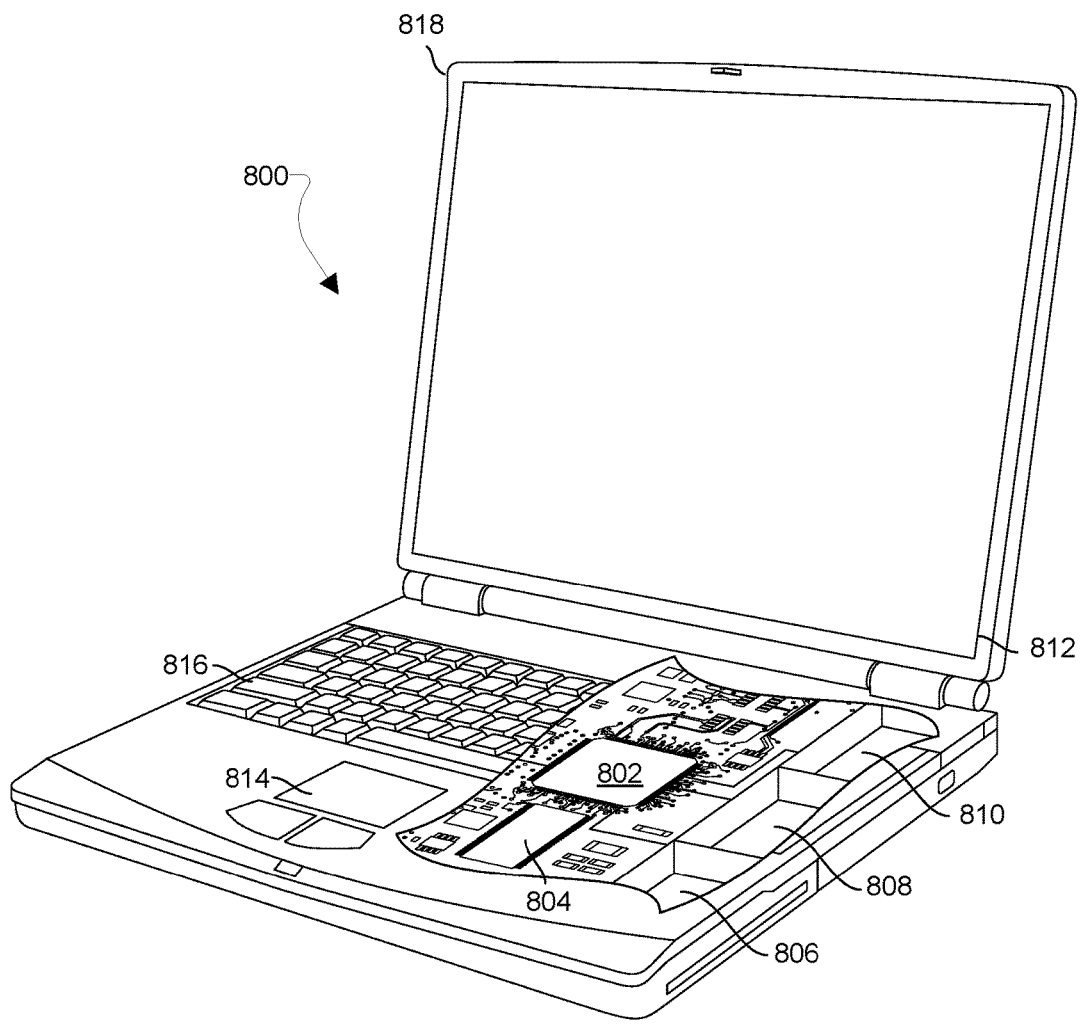
FIG. 8 is an illustration of an example laptop computer suitable for use with the various embodiments.

The various embodiments may also be implemented using any commercial computing devices having an RF radio, examples of which are illustrated in FIGS. 7 and 8. Typical mobile computing devices 700 will have in common the components illustrated in FIG. 7. For example, mobile computing devices 700 may include a processor 702 coupled to an internal memory 704 and a touch surface input device/display 706, such as a resistive sensing touchscreen, capacitive sensing touchscreen, infrared sensing touchscreen, acoustic/piezoelectric sensing touchscreen, or the like. The computing device 700 may have a radio/antenna 710 for sending and receiving electromagnetic radiation that is connected to a wireless data link and/or cellular telephone transceiver 708 coupled to the processor 702. Computing devices 700 may also include physical buttons 712 for receiving user inputs.

Other forms of computing devices, including personal computers and laptop computers, may be used to implementing the various embodiments. Such computing devices typically include the components illustrated in FIG. 8 which illustrates an example personal laptop computer 800. Such a personal computer 800 generally includes a processor 802 coupled to volatile memory 804 and a large capacity non-volatile memory, such as a disk drive 806. The computer 800 may also include a compact disc (CD) and/or DVD drive 808 coupled to the processor 802. The computer device 800 may also include a number of connector ports coupled to the processor 802 for establishing data connections or receiving external memory devices, such as a network connection circuit for coupling the processor 802 to a network. The computing device 800 may have a radio/antenna 810 for sending and receiving electromagnetic radiation that is connected to a wireless data link coupled to the processor 802. The computer 800 may further be coupled to a keyboard 816, a pointing device such as a mouse 814, and a display 812 as is well known in the computer arts.

The processors 502, 602, 702, 802 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 502, 602, 702, 802. In some devices, the processor 502, 602, 702, 802 may include internal memory sufficient to store the application software instructions. In some mobile devices, the secure memory may be in a separate memory chip coupled to the processor 502, 602, 702, 802. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 502, 602, 702, 802 itself.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of balancing power consumption among wireless earpieces, comprising:
    establishing a first communication link between a first wireless earpiece and a second wireless earpiece, wherein the first wireless earpiece assumes a master role and the second wireless earpiece assumes a slave role;
    establishing a second communication link between the first wireless earpiece and a source wireless device;
    receiving a first data transmission of a plurality of data transmissions from the source wireless device on the first wireless earpiece over the second communication link and relaying at least a portion of the received first data transmission from the first wireless earpiece to the second wireless earpiece over the first communication link;
    determining, by the first wireless earpiece, whether the source wireless device is currently controllable;
    sending a pause request to the source wireless device in response to determining that the source wireless device is currently controllable;
    identifying a media break in response to determining that the source wireless device is not currently controllable; and
    causing the source wireless device, during the identified media break or a pause resulting from the pause request, to send a second data transmission of the plurality of data transmissions to the second wireless earpiece over the second communication link by exchanging master-slave roles between the first wireless earpiece and the second wireless earpiece without informing the source wireless device of the master-slave role change and without terminating the second communication link, wherein exchanging of master-slave roles comprises swapping of addresses in link key fields associated with the first and second wireless earpieces.

2. The method of claim 1, further comprising:
    monitoring battery states of the first and second wireless earpieces; and
    determining whether to exchange master-slave roles based on a battery state of one or both of the first and second wireless earpieces.

3. The method of claim 1, wherein the first wireless earpiece, the second wireless earpiece, and the source wireless device are nodes in a piconet.

4. The method of claim 1, wherein exchanging master-slave roles further comprises:
    controlling a media source on the source wireless device so that master-slave roles are exchanged without disruption of data transmissions from the source wireless device.

5. The method of claim 1, further comprising:
    determining whether an audio signal is currently a monaural sound directed to a particular ear; and
    directing the audio signal to the one of the first wireless earpiece and the second wireless earpiece that is positioned in the particular ear after exchanging master-slave roles between the first wireless earpiece and the second wireless earpiece.

6. The method of claim 1, further comprising determining whether the source wireless device is currently able to receive the pause request, and
    wherein sending the pause request to the source wireless device in response to determining that the source wireless device is currently controllable further comprises transmitting the pause request to the source wireless device in response to determining that master-slave roles should be exchanged and determining that the source wireless device is currently able to receive the pause request, and
    wherein exchanging master-slave roles between the first wireless earpiece and the second wireless earpiece is accomplished in response to the source wireless device pausing data transmissions.

7. A mobile multi-media system, comprising:
    a first wireless earpiece;
    a second wireless earpiece;
    a source wireless device;
    means for establishing a first communication link between the first wireless earpiece and the second wireless earpiece, the first wireless earpiece assuming a master role and the second wireless earpiece assuming a slave role;
    means for establishing a second communication link between the first wireless earpiece and the source wireless device;
    means for receiving a first data transmission of a plurality of data transmissions from the source wireless device on the first wireless earpiece over the second communication link and relaying at least a portion of the received first data transmission from the first wireless earpiece to the second wireless earpiece over the first communication link;
    means for determining, by the first wireless earpiece, whether the source wireless device is currently controllable;
    means for sending a pause request to the source wireless device in response to determining that the source wireless device is currently controllable;
    means for identifying a media break in response to determining that the source wireless device is not currently controllable; and
    means for causing the source wireless device, during the identified media break or a pause resulting from the pause request, to send a second data transmission of the plurality of data transmissions to the second wireless earpiece over the second communication link by exchanging master-slave roles between the first wireless earpiece and the second wireless earpiece without informing the source wireless device of the master-slave role change and without terminating the second communication link, wherein exchanging of master-slave roles comprises swapping of addresses in link key fields associated with the first and second wireless earpieces.

8. The mobile multi-media system of claim 7, further comprising:
means for monitoring battery states of the first and second wireless earpieces; and
means for determining whether to exchange master-slave roles based on a battery state of one or both of the first and second wireless earpieces.

9. The mobile multi-media system of claim 7, wherein means for establishing the first communication link and means for establishing the second communication link comprise means for linking the first wireless earpiece, the second wireless earpiece, and the source wireless device together in a piconet configuration.

10. The mobile multi-media system of claim 7, wherein exchanging master-slave roles comprises controlling a media source on the source wireless device so that master-slave roles are exchanged without disruption of data transmissions from the source wireless device.

11. The mobile multi-media system of claim 7, further comprising:
means for determining whether an audio signal is currently a monaural sound directed to a particular ear; and
means for directing the audio signal to the one of the first wireless earpiece and the second wireless earpiece that is positioned in the particular ear after exchanging master-slave roles between the first wireless earpiece and the second wireless earpiece.

12. The mobile multi-media system of claim 7, further comprising means for determining whether the source wireless device is currently able to receive the pause request,
wherein means for sending the pause request to the source wireless device in response to determining that the source wireless is currently controllable further comprises means for transmitting the pause request to the source wireless device in response to determining that master-slave roles should be exchanged and determining that the source wireless device is currently able to receive the pause request, and
wherein means for exchanging master-slave roles between the first wireless earpiece and the second wireless earpiece comprises means for exchanging master-slave roles between the first wireless earpiece and the second wireless earpiece in response to the source wireless device pausing data transmissions.

13. A mobile multi-media system, comprising:
a first wireless earpiece comprising a first transceiver and a first processor coupled to the first transceiver;
a second wireless earpiece comprising a second transceiver and a second processor coupled to the second transceiver; and
a source wireless device comprising a source transceiver and a source processor coupled to the source transceiver,
wherein the first processor is configured with processor-executable instructions to perform operations comprising:
establishing a first communication link with the second wireless earpiece and assuming a master role while the second wireless earpiece assumes a slave role;
establishing a second communication link between the first wireless earpiece and the source wireless device;
receiving a first data transmission of a plurality of data transmissions from the source wireless device over the second communication link and relaying at least a portion of the received first data transmission to the second wireless earpiece over the first communication link;
determining, by the first wireless earpiece, whether the source wireless device is currently controllable;
sending a pause request to the source wireless device in response to determining that the source wireless device is currently controllable;
identifying a media break in response to determining that the source wireless device is not currently controllable; and
causing the source wireless device, during the identified media break or a pause resulting from the pause request, to send a second data transmission of the plurality of data transmissions to the second wireless earpiece over the second communication link by exchanging master-slave roles with the second wireless earpiece without informing the source wireless device of the master-slave role change and without terminating the second communication link, wherein exchanging of master-slave roles with the second wireless earpiece comprises swapping of addresses in link key fields associated with the first and second wireless earpieces by replacing a current address in a link key field with a new address associated with the second wireless earpiece, and
wherein the second processor is configured with processor-executable instructions to perform operations comprising:
exchanging master-slave roles with the first wireless earpiece; and
receiving the second data transmission of the plurality of data transmissions from the source wireless device over the second communication link in response to exchanging master-slave roles.

14. The mobile multi-media system of claim 13, wherein the first processor is configured with processor-executable instructions to perform operations further comprising:
monitoring a battery state; and
determining whether to exchange master-slave roles based on the battery state.

15. The mobile multi-media system of claim 13, wherein the first processor is configured with processor-executable instructions such that establishing the first and second communication links comprises linking the first wireless earpiece to the second wireless earpiece and the source wireless earpiece in a piconet configuration.

16. The mobile multi-media system of claim 13, wherein the first processor is configured with processor-executable instructions to perform operations further comprising:
determining whether to exchange master-slave roles based on information received from the source wireless device indicating a time that master-slave roles may be exchanged without disruption of data transmissions from the source wireless device.

17. The mobile multi-media system of claim 13, wherein the first processor is configured with processor-executable instructions to perform operations further comprising:

determining whether an audio signal is currently a monaural sound directed to a particular ear;
determining if the first wireless earpiece is configured for use in the particular ear; and
directing the audio signal to the second wireless earpiece after exchanging master-slave roles with the second wireless earpiece in response to determining that the first wireless earpiece is not configured for use in the particular ear.

18. The mobile multi-media system of claim 13, wherein the first processor is configured with processor-executable instructions to perform operations further comprising determining whether the source wireless device is currently able to receive the pause request,
wherein sending the pause request to the source wireless device in response to determining that the source wireless device is currently controllable further comprises transmitting the pause request to the source wireless device in response to determining that master-slave roles should be exchanged and determining that the source wireless device is currently able to receive the pause request, and
wherein the first processor is configured with processor-executable instructions such that exchanging master-slave roles with the second wireless earpiece is accomplished in response to the source wireless device pausing data transmissions.

19. A wireless earpiece, comprising:
means for establishing a first communication link with a second wireless earpiece;
means for establishing a second communication link with a source wireless device;
means for receiving a first data transmission of a plurality of data transmissions from the source wireless device over the second communication link and relaying at least a portion of the received first data transmission to the second wireless earpiece over the first communication link;
means for determining, by the wireless earpiece, whether the source wireless device is currently controllable;
means for sending a pause request to the source wireless device in response to determining that the source wireless device is currently controllable;
means for identifying a media break in response to determining that the source wireless device is not currently controllable; and
means for causing the source wireless device, during the identified media break or a pause resulting from the pause request, to send a second data transmission of the plurality of data transmissions to the second wireless earpiece over the second communication link by exchanging master-slave roles with the second wireless earpiece without informing the source wireless device of the master-slave role change and without terminating the second communication link, wherein exchanging of master-slave roles comprises swapping of addresses in link key fields associated with the first and second wireless earpieces by replacing a current address in a link key field with a new address associated with the second wireless earpiece.

20. The wireless earpiece of claim 19, further comprising:
means for monitoring a battery state of the wireless earpiece; and
means for determining whether to exchange master-slave roles based on the battery state.

21. The wireless earpiece of claim 19, wherein means for establishing the first communication link and means for establishing the second communication link comprise means for linking the wireless earpiece to the second wireless earpiece and the source wireless device in a piconet configuration.

22. The wireless earpiece of claim 19, further comprising:
determining whether to exchange master-slave roles based on information received from the source wireless device indicating a time that master-slave roles may be exchanged without disruption of data transmissions from the source wireless device.

23. The wireless earpiece of claim 19, further comprising:
means for determining whether an audio signal is currently a monaural sound directed to a particular ear;
means for determining whether the wireless earpiece is configured for use in the particular ear; and
means for directing the audio signal to the second wireless earpiece after exchanging master-slave roles with the second wireless earpiece in response to determining that the wireless earpiece is not configured for use in the particular ear.

24. The wireless earpiece of claim 19, further comprising means for determining whether the source wireless device is currently able to receive the pause request,
wherein means for sending the pause request to the source wireless device in response to determining that the source wireless device is currently controllable further comprises means for transmitting the pause request to the source wireless device in response to determining that master-slave roles should be exchanged and determining that the source wireless device is currently able to receive the pause request, and
wherein means for exchanging master-slave roles comprises means for exchanging master-slave roles in response to the source wireless device pausing data transmissions.

25. A wireless earpiece, comprising:
a transceiver; and
a processor coupled to the transceiver and configured with processor-executable instructions to perform operations comprising:
establishing a first communication link with a second wireless earpiece via the transceiver;
establishing a second communication link with a source wireless device via the transceiver;
receiving a first data transmission of a plurality of data transmissions from the source wireless device over the second communication link and relaying at least a portion of the received first data transmission to the second wireless earpiece over the first communication link;
determining, by the wireless earpiece, whether the source wireless device is currently controllable;
sending a pause request to the source wireless device in response to determining that the source wireless device is currently controllable;
identifying a media break in response to determining that the source wireless device is not currently controllable; and
causing the source wireless device, during the identified media break or a pause resulting from the pause request, to send a second data transmission of the plurality of data transmissions to the second wireless earpiece over the second communication link by exchanging master-slave roles with the second wireless earpiece without informing the source wireless device of the master-slave role change and without terminating the second communication link, wherein exchanging of master-slave roles comprises swapping of addresses in link key fields associated with the first and second wireless earpieces by replacing a current address in a link key field with a new address associated with the second wireless earpiece.

26. The wireless earpiece of claim 25, wherein the processor is configured with processor-executable instructions to perform operations further comprising:
monitoring a battery state of the wireless earpiece; and
determining whether to exchange master-slave roles based on the battery state of the wireless earpiece.

27. The wireless earpiece of claim 25, wherein the processor is configured with processor-executable instructions such that establishing the first and second communication links comprises linking the wireless earpiece to the second wireless earpiece and the source wireless device in a piconet configuration.

28. The wireless earpiece of claim 25, wherein the processor is configured with processor-executable instructions to perform operations further comprising:
determining whether to exchange master-slave roles based on information received from the source wireless device indicating a time that master-slave roles may be exchanged without disruption of data transmissions from the source wireless device.

29. The wireless earpiece of claim 25, wherein the processor is configured with processor-executable instructions to perform operations further comprising:
determining whether an audio signal is currently a monaural sound directed to a particular ear;
determining if the wireless earpiece is configured for use in the particular ear; and
directing the audio signal to the second wireless earpiece after exchanging master-slave roles with the second wireless earpiece in response to determining that the wireless earpiece is not configured for use in the particular ear.

30. The wireless earpiece of claim 25, wherein the processor is configured with processor-executable instructions to perform operations further comprising determining whether the source wireless device is currently able to receive the pause request,
wherein sending the pause request to the source wireless device in response to determining that the source wireless device is currently controllable further comprises transmitting the pause request to the source wireless device in response to determining that master-slave roles should be exchanged and determining that the source wireless device is currently able to receive the pause request, and
wherein the processor is configured with processor-executable instructions such that exchanging master-slave roles comprises exchanging master-slave roles in response to the source wireless device pausing data transmissions.

31. A method of balancing power consumption among wireless earpieces, comprising:
establishing a first communication link between a first wireless earpiece and a second wireless earpiece, wherein the first wireless earpiece assumes a master role and the second wireless earpiece assumes a slave role;
establishing a second communication link between the first wireless earpiece and a source wireless device;
receiving a first data transmission of a plurality of data transmissions from the source wireless device on the first wireless earpiece over the second communication link and relaying at least a portion of the received first data transmission from the first wireless earpiece to the second wireless earpiece over the first communication link;
determining, by the first wireless earpiece, whether the source wireless device is currently controllable;
sending a pause request to the source wireless device in response to determining that the source wireless device is currently controllable;
identifying a media break in response to determining that the source wireless device is not currently controllable; and
causing the source wireless device, during the identified media break or a pause resulting from the pause request, to send a second data transmission of the plurality of data transmissions to the second wireless earpiece over the second communication link by exchanging master-slave roles between the first wireless earpiece and the second wireless earpiece without informing the source wireless device of the master-slave role change and without terminating the second communication link.

* * * * *